US011336671B2

(12) United States Patent
Kim et al.

(10) Patent No.: US 11,336,671 B2
(45) Date of Patent: May 17, 2022

(54) METHOD AND APPARATUS FOR DETECTING ANOMALY IN A PLURALITY OF DEVICES BY COLLECTIVELY ANALYZING INFORMATION ON DEVICES

(71) Applicant: KOREA INTERNET & SECURITY AGENCY, Jeollanam-do (KR)

(72) Inventors: Mi Joo Kim, Jeollanam-do (KR); Woong Go, Jeollanam-do (KR); Sung Taek Oh, Jeollanam-do (KR); Jae Hyuk Lee, Jeollanam-do (KR); Jun Hyung Park, Jeollanam-do (KR)

(73) Assignee: KOREA INTERNET & SECURITY AGENCY, Jeollanam-do (KR)

( * ) Notice: Subject to any disclaimer, the term of this patent is extended or adjusted under 35 U.S.C. 154(b) by 265 days.

(21) Appl. No.: 16/517,474

(22) Filed: Jul. 19, 2019

(65) Prior Publication Data

US 2020/0195674 A1 Jun. 18, 2020

(30) Foreign Application Priority Data

Dec. 18, 2018 (KR) ........................ 10-2018-0163676

(51) Int. Cl.
*G06F 21/55* (2013.01)
*H04L 29/06* (2006.01)

(52) U.S. Cl.
CPC .......... *H04L 63/1425* (2013.01); *H04L 63/12* (2013.01); *H04L 63/1441* (2013.01)

(58) Field of Classification Search
CPC ............. H04L 63/1416; H04L 63/1408; H04L 63/1441; H04L 63/1433; H04L 63/12; H04L 63/1425; H04W 24/08; H04W 64/003; H04W 12/126; G06Q 10/0635
See application file for complete search history.

(56) References Cited

U.S. PATENT DOCUMENTS 10,291,637 B1 * 5/2019 Bardenstein ........ H04L 63/1408
2008/0256242 A1 * 10/2008 Liebman .............. G11B 27/034
709/226

(Continued)

FOREIGN PATENT DOCUMENTS

KR 10-0733387 B1 6/2007
KR 10-2011-0131627 A 12/2011

(Continued)

OTHER PUBLICATIONS

Premkumar et al., "A modified design to eliminate passband anomaly in weighted minimax quadrature mirror filters," IEEE Signal Processing Letters Year: 2000 | vol. 7, Issue: 8 | Journal Article | Publisher: IEEE.*

(Continued)

*Primary Examiner* — Roderick Tolentino
(74) *Attorney, Agent, or Firm* — Studebaker & Brackett PC

(57) ABSTRACT

Provided are a method for detecting an anomaly in devices, the method being performed by a computing device and comprising: acquiring operation information on a first device connected to a security management unit (SMU) of a first domain, and operation information on a second device connected to a SMU of a second domain, and detecting an anomaly in the first device and/or the second device by comparing the operation information on the first device with the operation information on the second device, wherein the SMU of the first domain is not directly connected to the SMU of the second domain.

17 Claims, 15 Drawing Sheets

(56) References Cited

U.S. PATENT DOCUMENTS

| | | | | |
|---|---|---|---|---|
| 2011/0208366 | A1* | 8/2011 | Taft | H04L 29/08846 700/295 |
| 2013/0082918 | A1* | 4/2013 | Jano | H04M 1/72412 345/156 |
| 2016/0225372 | A1* | 8/2016 | Cheung | G10L 15/22 |
| 2016/0261465 | A1* | 9/2016 | Gupta | H04L 43/04 |
| 2016/0315909 | A1* | 10/2016 | von Gravrock | H04L 63/1425 |
| 2018/0069879 | A1* | 3/2018 | Epstein | H04L 63/1425 |
| 2018/0234445 | A1* | 8/2018 | Bhatt | H04L 63/1433 |
| 2019/0036948 | A1* | 1/2019 | Appel | H04L 63/20 |

FOREIGN PATENT DOCUMENTS

| | | | |
|---|---|---|---|
| KR | 10-2014-0047218 | A | 4/2014 |
| KR | 10-1781780 | B1 | 10/2017 |
| KR | 10-2017-0129489 | A | 11/2017 |
| KR | 10-1893519 | B1 | 8/2018 |

OTHER PUBLICATIONS

Taylor et al., "Anomaly Detection in Automobile Control Network Data with Long Short-Term Memory Networks," 2016 IEEE International Conference on Data Science and Advanced Analytics (DSAA) Year: 2016 | Conference Paper | Publisher: IEEE.*

Office Action in Korean Patent Application No. 10-2018-0163676, dated Mar. 28, 2019 (no translation available).

* cited by examiner

METHOD AND APPARATUS FOR DETECTING ANOMALY IN A PLURALITY OF DEVICES BY COLLECTIVELY ANALYZING INFORMATION ON DEVICES

This application claims priority from Korean Patent Application 10-2018-0163676 filed on Dec. 18, 2018 in the Korean Intellectual Property Office, the disclosure of which is incorporated herein by reference in its entirety.

BACKGROUND

1. Field of the Disclosure

The present disclosure relates to a method for detecting an anomaly in devices of interest using information on a plurality of devices. More particularly, the present disclosure relates to a method for detecting an anomaly in each of a plurality of devices by collectively using information on the plurality of devices which otherwise cannot be detected using isolated information on an individual device.

2. Description of the Related Art

Internet of Things (IoT) devices are all connected to a single network, and accordingly the entire IoT environment may be in danger if one of them is infected with a malicious code. Therefore, it is important to detect anomalies in IoT devices early and solve problems.

Unfortunately, as "human-like" intelligent malicious codes increase recently, it is difficult to detect such intelligent malicious codes accurately and quickly with existing security systems that detect the individual status of IoT devices.

Accordingly, what is required is a technology that can quickly and accurately detect whether an anomaly has occurred in a device by analyzing information on a plurality of devices collectively. (see Korean Patent Laid-Open Publication No. 2010-0067667)

SUMMARY

Aspects of the present disclosure provide a method and apparatus for detecting an anomaly in devices using information on another device, which otherwise is difficult to detect using isolated information on each of the devices.

This and other aspects, embodiments and advantages of the present disclosure will become immediately apparent to those of ordinary skill in the art upon review of the Detailed Description and Claims to follow.

According to an aspect of the inventive concept, there is provided a method for detecting an anomaly in devices, the method being performed by a computing device and comprising: acquiring operation information on a first device connected to a security management unit (SMU) of a first domain, and operation information on a second device connected to a SMU of a second domain, and detecting an anomaly in the first device and/or the second device by comparing the operation information on the first device with the operation information on the second device, wherein the SMU of the first domain is not directly connected to the SMU of the second domain.

According to an embodiment, wherein the detecting an anomaly comprises determining that is an anomaly in the first device and/or the second device if a manufacturer of the first device is identical to a manufacturer of the second device.

According to an embodiment, wherein the detecting an anomaly comprises determining that there is an anomaly in the first device and/or the second device if a product name of the first device is identical to a product name of the second device.

According to an embodiment, wherein the detecting an anomaly comprises determining that is an anomaly in the first device and/or the second device if the first domain is identical to the second domain.

According to an embodiment, wherein the detecting an anomaly comprises determining that is an anomaly in the first device and/or the second device if a product name of the first device is different from a product name of the second die and a manufacturer of the first device is identical to a manufacturer of the second device.

According to an embodiment, wherein the detecting an anomaly in the first device and/or the second device by comparing the operation information on the first device with the operation information on the second device comprises determining that there is an anomaly in the first device and/or the second device if the operation information of the first device is similar to the operation information of the second device.

According to an embodiment, wherein the detecting an anomaly in the first device and/or the second device by comparing the operation information on the first device with the operation information on the second device comprises determining that there is an anomaly in the first device and/or the second device if pattern information on behavior of the first device is similar to pattern information on behavior of the second device.

According to an embodiment, wherein the detecting an anomaly in the first device and/or the second device by comparing the operation information on the first device with the operation information on the second device comprises detecting an anomaly in the first device and/or the second device by using information obtained by combining behavior information of the first device and behavior information of the second device different from the behavior information of the first device.

According to an embodiment, wherein the detecting an anomaly comprises detecting an anomaly in the first device and/or the second device by comparing a cycle of a power status of the first device with a cycle of a power status of the second device.

According to an embodiment, wherein the detecting an anomaly comprises detecting an anomaly in the first device and/or the second device by comparing process information of the first device with process information of the second device.

According to an embodiment, wherein the detecting an anomaly comprises detecting an anomaly in the first device and/or the second device by comparing CPU usage of a process running in the first device with CPU usage of a process running in the second device.

According to an embodiment, wherein the detecting an anomaly comprises detecting an anomaly in the first device and/or the second device by comparing memory usage of a process running in the first device with memory usage of a process running in the second device.

According to an embodiment, wherein the detecting an anomaly comprises detecting an anomaly in the first device and/or the second device by comparing file hash values of the first device with file hash values of the second device.

According to an embodiment, wherein the detecting an anomaly comprises detecting an anomaly in the first device and/or the second device by comparing commands input to the first device with commands input to the second device.

According to an embodiment, wherein the detecting an anomaly in the first device and/or the second device by comparing the operation information on the first device with the operation information on the second device comprises detecting an anomaly in the first device and/or the second device by comparing a su (substitute) command input to the first device with a su command input to the second device.

According to an embodiment, wherein the detecting an anomaly in the first device and/or the second device by comparing the operation information on the first device with the operation information on the second device comprises detecting an anomaly in the first device and/or the second device by comparing a chmod(change mode) command input to the first device with a chmod command input to the second device.

According to an embodiment, wherein the detecting an anomaly comprises detecting an anomaly in the first device and/or the second device by comparing inbound packet information sent to the first device with inbound packet information sent to the second device.

According to an embodiment, wherein the detecting an anomaly in the first device and/or the second device by comparing inbound packet information sent to the first device with inbound packet information sent to the second device comprises detecting an anomaly in the first device and/or the second device by comparing source regional information of inbound packet sent to the first device with source regional information of inbound packet sent to second first device.

According to an embodiment, wherein the detecting an anomaly comprises detecting an anomaly in the first device and/or the second device by comparing outbound packet information sent to the first device with outbound packet information sent to the second device.

According to an embodiment, wherein the detecting an anomaly in the first device and/or the second device by comparing outbound packet information sent to the first device with outbound packet information sent to the second device comprises detecting an anomaly in the first device and/or the second device by comparing destination regional information of outbound packet sent to the first device with destination regional information of outbound packet sent to second first device.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Hereinafter, embodiments of the present disclosure will be described with reference to the attached drawings. Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, exemplary embodiments of the present disclosure will be described with reference to the accompanying drawings.

Figure 1:
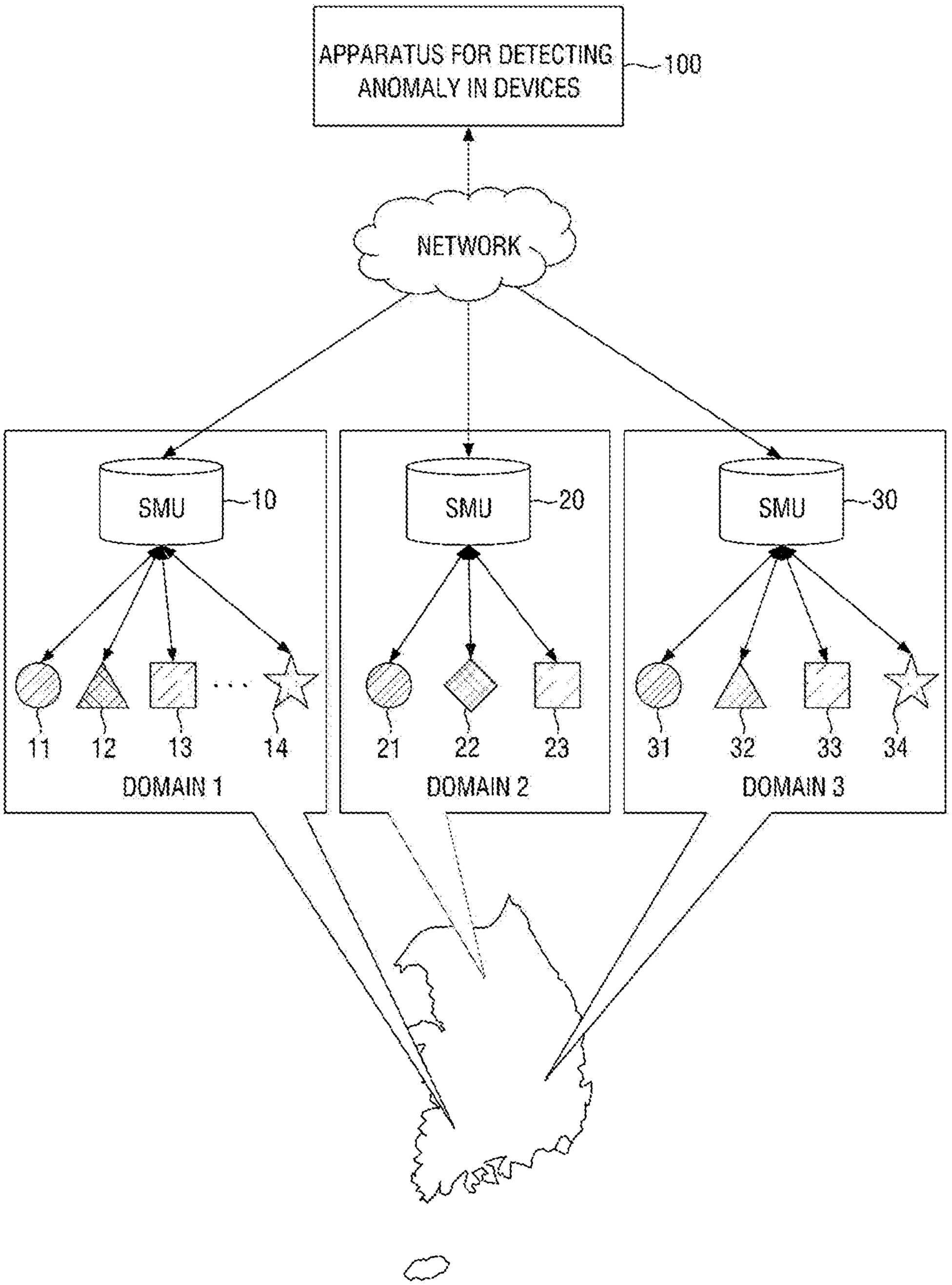
FIG. 1 is a view showing configuration and operation of a system for detecting an anomaly in devices according to an exemplary embodiment of the present disclosure.

The configuration and operation of an apparatus for detecting anomaly in a device will be described with reference to FIG. 1. The apparatus for detecting anomaly in a device can detect if there is anomaly in each of devices and in a plurality of domains by receiving statuses of devices existing in the domains through a network.

The domains may refer to physically separated regions, a plurality of networks separated in the same region, or a virtual network area separated through a plurality of APs in the same network. A single domain may be divided into a plurality of subsidiary domains.

The domains may include security management units SMUs 10, 20 and 30 and one or more devices 11, 12, 13, 14, 21, 22, 23, 31, 32, 33 and 34. For example, Domain 1 may include a single SMU 10 and four or more different devices 11, 12, 13 and 14. Domain 3 may include a single SMU 30 and the same types of devices 31, 32, 33 and 34 as those included in Domain 1. Domain 2 may include a single SMU 20 and the same type of devices 21 and 23 as and different types of devices 22 from those in Domain 3.

At least one SMU 10, 20 and 30 may exist in each of domains. The SMU may receive a request for device information and domain information from an apparatus 100 for detecting anomaly in a device, and may send to the apparatus 100 status information on each of the plurality of devices existing in the domains, network packet information sent/received to/from the domains, and inbound and outbound traffic information.

The apparatus 100 may detect anomaly in each of the devices 11, 12, 13, 14, 21, 22, 23, 31, 32, 33 and 34 by using the device information received from the SMUs 12 20 and 30. In particular, even if certain anomaly is not be detected by using the isolated information on an individual deice, it may be detected by collectively analyzing the information with information on other devices in different domains.

For example, if an AP included in a domain is rebooted every thirty days, it may be determined that there is an error in the AP based on the information on the AP. However, if APs in a hundred different domains are rebooted every thirty days, it is very likely that there is an attack of a malicious code. Therefore, the apparatus for detecting an anomaly in devices can detect such a situation as an anomaly.

Figure 2:
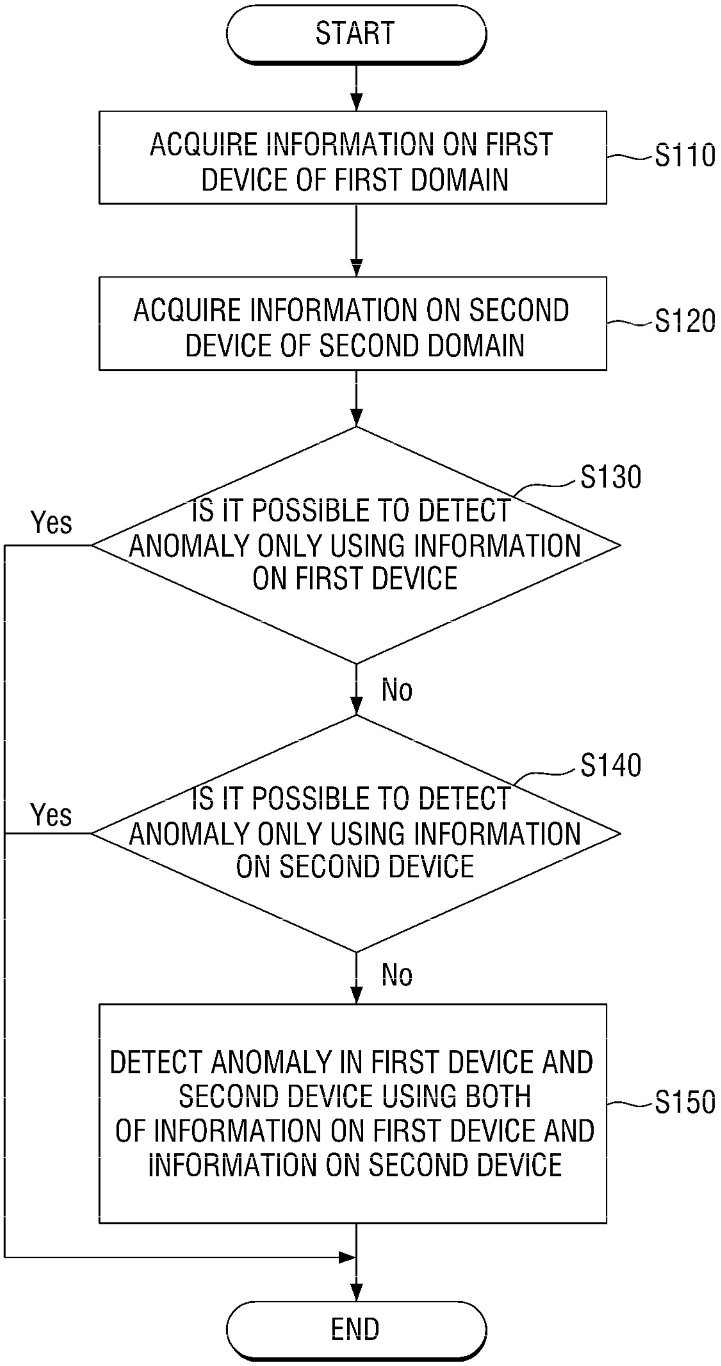
FIG. 2 is a flowchart for illustrating a method for detecting an anomaly in devices according to another exemplary embodiment of the present disclosure.

A flowchart illustrating a method for detecting anomaly according to the exemplary embodiment of the present disclosure will be described with reference to FIG. 2.

In step S110, information on a first device included in a first domain is obtained. The information on a device may include at least one of hardware information, software information and status information on the device. The hardware information may include, for example, product name, product version, and manufacturer information. The software information may include, for example, information on the operating system of the firmware of a device, the version of the firmware, and the application software installed in the device.

The device status information may include information on the power status of a device, information associated with CPU usage, memory usage and processes, network packet information, information on files input/output and stored, information associated with a user and the user's authority, information on service, information associated with network ports and IPs, and information on commands that are input to the device. Detailed description on this will be given later with reference to FIGS. 7 to 12.

In step S120, information on a second device included in a second domain is obtained. The first domain and the second domain may include networks that are physically or systematically separated from each other. According to the exemplary embodiment of the present disclosure, it is possible to detect early an attack of a malicious code that may be generated later by collectively using device information on each of the devices included in a plurality of domains to determine an anomaly in a device.

It is to be noted that steps S130 and S140 are not necessarily carried out sequentially but may be carried out in parallel.

In step S130, it is determined whether it is possible to determine an anomaly in the first device by using the information on the first device included in the first domain. If an anomaly is detected in the first device based on the information on the first device, the process of detecting an anomaly in the first device may be terminated without collectively determining it in conjunction with the information on a second device in a second domain, in order to reduce the computational burden of the computing device.

In step S140, it is determined whether it is possible to determine an anomaly in the second device by using the information on the second device included in the second domain, similarly to step S130. If an anomaly is detected in the second device based on the information on the second device, the process of detecting an anomaly in the second device may be terminated without collectively determining it in conjunction with the information on the first device in the first domain, in order to reduce the computational burden of the computing device.

In step S150, it may be detect if there is an anomaly in the first device or the second device using the obtained information on the first device and the information on the second device. That is to say, information on the second device may be used to detect an anomaly in the first device, and information on the first device may be used to detect an anomaly in the second device. More detailed description thereon will be given later with reference to FIG. 3.

Figure 3:
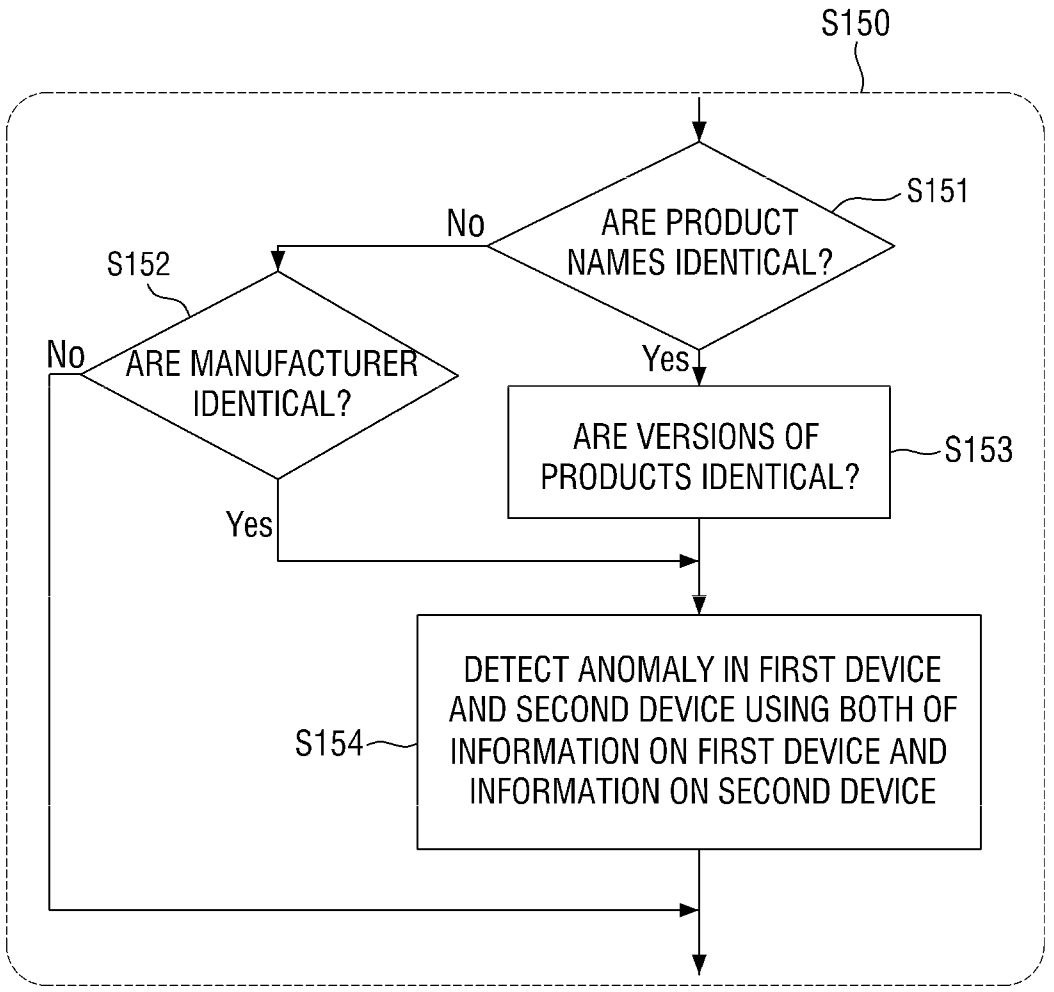
FIG. 3 is a flowchart for illustrating some operations of FIG. 2.

A method of designating other devices used to detect an anomaly in a first device or a second device will be described with reference to FIG. 3.

In step S151, according to an exemplary embodiment of the present disclosure, it is possible to detect an anomaly in a device by using a plurality of devices having the same product name.

For example, in order to detect an anomaly in the first device, the information on the second device having the same product name with the first device may be used. For the devices having the same product name, the attack pattern of malicious codes and the behavior of the infected device are similar, and thus it is possible to collectively analyze information pieces on a plurality of devices having the same product name.

In step S152, according to another exemplary embodiment of the present disclosure, it is possible to detect an anomaly in a device by using a plurality of devices, which have different product names but are from the same manufacturer.

For example, in order to detect an anomaly in a first device, the information on a second device that has a different product name but is from the same manufacturer may be used. Although devices have different product names, the device from the same manufacturer have similar hardware configuration and software architecture. Accordingly, the devices from the same manufacturer may be infected by similar types of malicious codes, and thus it is possible to efficiently detect an anomaly by analyzing the information on the devices collectively.

In step S153, according to yet another exemplary embodiment of the present disclosure, it may be further determined whether the products are of the same version. In order to increase the computation speed and accuracy of the computing device, if it is determined that the devices are of the same version, the information on the devices may be compared to detect an anomaly in the devices. The version of the products may be a hardware version or a firmware version.

Figure 4:
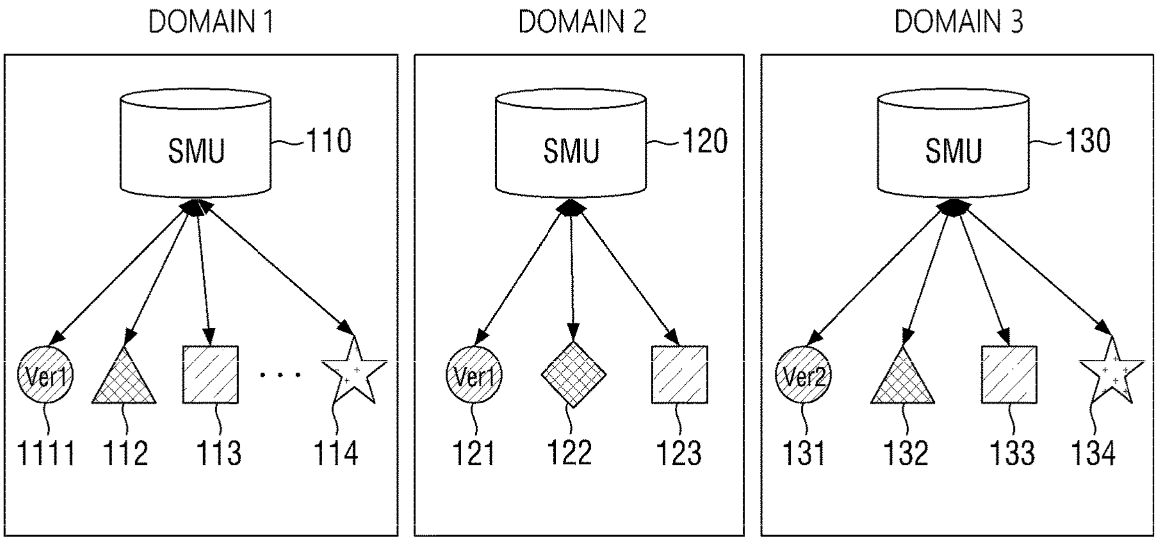
FIG. 4 is a view showing a method for detecting an anomaly in a plurality of devices existing in a plurality of domains according to yet another exemplary embodiment of the present disclosure.

Referring to FIG. 4, a method of designating a plurality of devices to detect an anomaly in a device using information on the plurality of devices will be described in detail. The domains may include SMUs 110, 120 and 130, respectively, for managing inbound and outbound traffics of the domains and managing devices included in the domains.

According to yet another exemplary embodiment of the present disclosure, the information on some of the plurality of devices existing in the domains that are associated with a device of interest may be used in order to increase the efficiency of a computing operation for detecting an anomaly in the device. It is inefficient in terms of speed and accuracy to detect an anomaly in the device by using the information on all of the devices existing in the domains.

According to an exemplary embodiment of the present disclosure, to detect an anomaly in a device of interest 111 included in Domain 1, the information on devices of the same product names 121 and 131 existing in different domains may be used. When the information on the devices 112, 113, 114, 122, 123, 132, 133 and 134 having different product names is used, a malicious code that is unique to the device of interest may not be detected.

In addition, according to yet another exemplary embodiment of the present disclosure, the information on some of the plurality of devices existing in the domains that are from the same manufacturer with a device of interest may be used in order to detect an anomaly in the device.

That is to say, in order to detect an anomaly in a device of interest 112 included in Domain 1, the information on a device 122 in Domain 2 that has a different product name but is from the same manufacturer, may be used, in addition to the information on a device 132 in Domain 3 that has the same product name. The devices 112, 122 and 132 from the same manufacturer may include similar hardware configurations and similar software architectures, and thus they may be attacked and infected by similar types of malicious codes.

According to yet another exemplary embodiment of the present disclosure, a method for detecting an anomaly in devices of interest may include using information on devices having the same product name and of the same version among the devices existing in different domains.

That is to say, to detect an anomaly in a device of interest 111 in Domain 1, information on a device 121 in Domain 2 of the same product and the same version may be used, while information on a device 131 in Domain 3 of the same product and a different version may not be used. For example, if there are many devices having the same product name such as smartphones in a domain, information on the device of the same version may be used to detect an anomaly in a device of interest, in order to reduce computational burden and to perform optimal detection.

Figure 5:
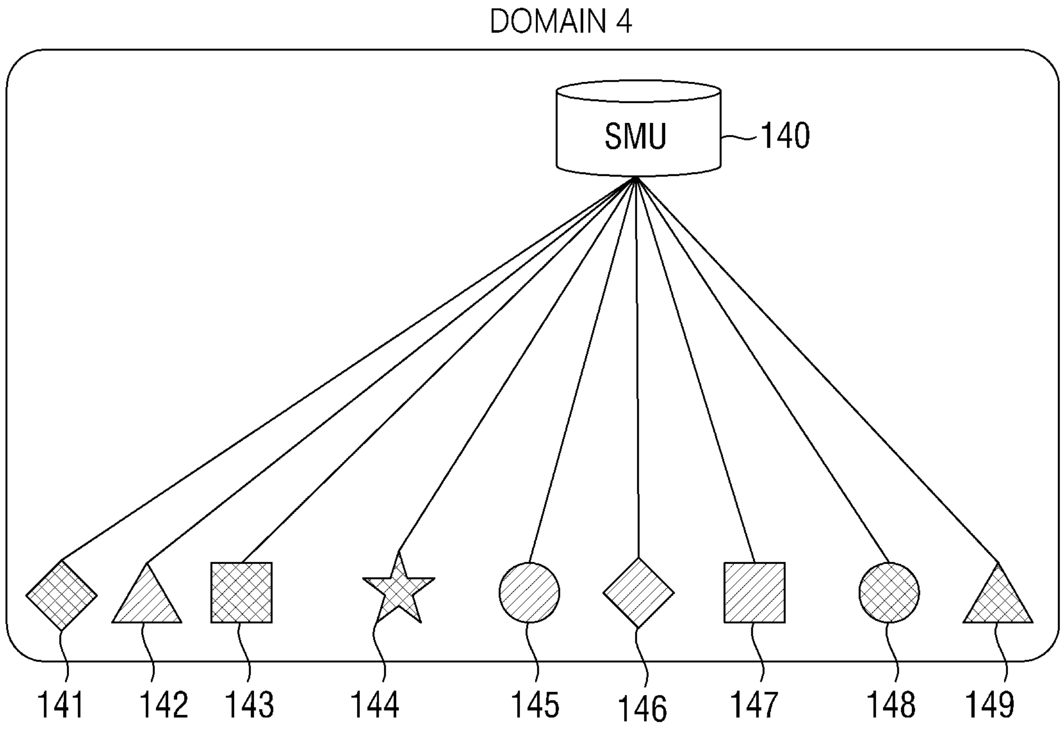
FIG. 5 is a view showing a method for detecting an anomaly in a plurality of devices existing in a single domain according to yet another exemplary embodiment of the present disclosure.

Referring to FIG. 5, a method for detecting an anomaly in devices of interest using a plurality of device information pieces existing in the same domain according to a yet another exemplary embodiment of the present disclosure will be described in more detail with reference to 5.

According to the exemplary embodiment of the present disclosure, when a plurality of device information pieces is used in a domain, devices may be designated by various methods as described above with reference to FIG. 4. It is to be noted that priorities of the criteria for designating devices are not particularly specified herein.

For example, although there is a device 149 having the same product name with a device of interest 142 in Domain 4 managed by a single SMU 140, if it is better to use information on devices 145, 146 and 147 from the same manufacturer based on the information acquired from the device 142, the information on the devices 145, 146 and 147 from the same manufacturer may be used, excluding the information on the device 149 having the same product name.

Figure 6:
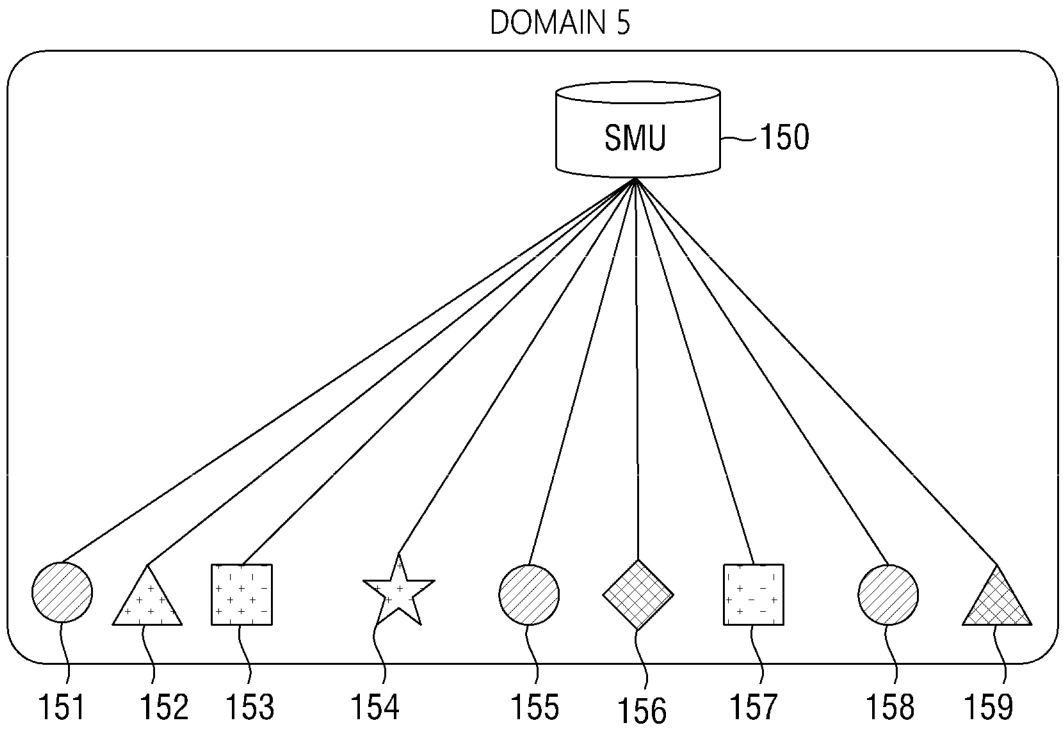
FIG. 6 is a view showing a method for detecting an anomaly in a plurality of devices having the same product name existing in a single domain according to yet another exemplary embodiment of the present disclosure.

According to still another exemplary embodiment shown in FIG. 6, an anomaly in a device of interest may be detected by using information on devices of the same product and the same version strictly.

For example, among a plurality of devices existing in Domain 5 managed by a single SMU 150, information on some of them that are manufactured by the same manufacturer and have the same version with a device of interest 151 may be used to detect an anomaly in the device 151.

According to the exemplary embodiment of the present disclosure, information on a device 159 that has the same product name with a device of interest 151 but is from a different manufacturer may not be used. In addition, information on devices 153, 154 and 157 that are from the same manufacturer with the device 152 but have different product names may not be used.

Hereinafter, a method for detecting an anomaly between a device of interest and devices designated by a variety of criteria described above will be described in detail.

According to an exemplary embodiment of the present disclosure, a power status of a device may be used as the information on a device of interest and the information on designated devices used in detecting an anomaly in the device of interest. Specifically, it is possible to detect an anomaly in the device of interest by using the information on the timing, the cycle, the number of times and the duration of turning on the power of the device of interest and the designated devices.

For example, it may be determined that there is an anomaly if the devices are powered on or off at the same time, if they remain powered on or off at a particular time, and if they are powered on or off at the same or a similar cycle.

According to another exemplary embodiment of the present disclosure, a status of a device may be used as the information on a device of interest and the information on designated devices used in detecting an anomaly in the device of interest. The device status may include a slip status where it has no input/output, a transmission status where it communicates with a network, a status where the firmware is upgrading, and a status where application is running. It is to be noted that the device status is not limited thereto but may include a variety of modes defined depending on devices and services performed by devices.

According to yet another exemplary embodiment of the present disclosure, a process of a device may be used as the information on a device of interest and the information on designated devices used in detecting an anomaly in the device of interest. For example, it may be determined that there is an anomaly if the same process which is not on a white list is performed in a plurality of devices, or if the same process is performed repeatedly. In addition, it is possible to detect an anomaly in a device of interest by using information on the CPU usage and memory usage of a device when a process is performed.

According to yet another exemplary embodiment of the present disclosure, the CPU usage or memory usage of a device may be used as the information on a device of interest and the information on designated devices used in detecting an anomaly in the device of interest. Specifically, it is possible to detect an anomaly in the device of interest and the designated devices if the CPU usage of a device of interest and the CPU usage of designated devices is above 99%, if the CPU usage lasts above 50% for more than first minutes and/or if the CPU usage lasts above 30% for more than one hour.

According to yet another exemplary embodiment of the present disclosure, the information on a device of interest may be different from the information on designated devices used in detecting an anomaly in the device of interest. Specifically, the information on a device of interest may be CPU usage, while the information on designated devices may be memory usage. It may be determined that there is an anomaly in the device of interest and the designated devices if meaningful data is obtained by collectively analyzing the information on the devices, which will be described later.

Figure 7A:
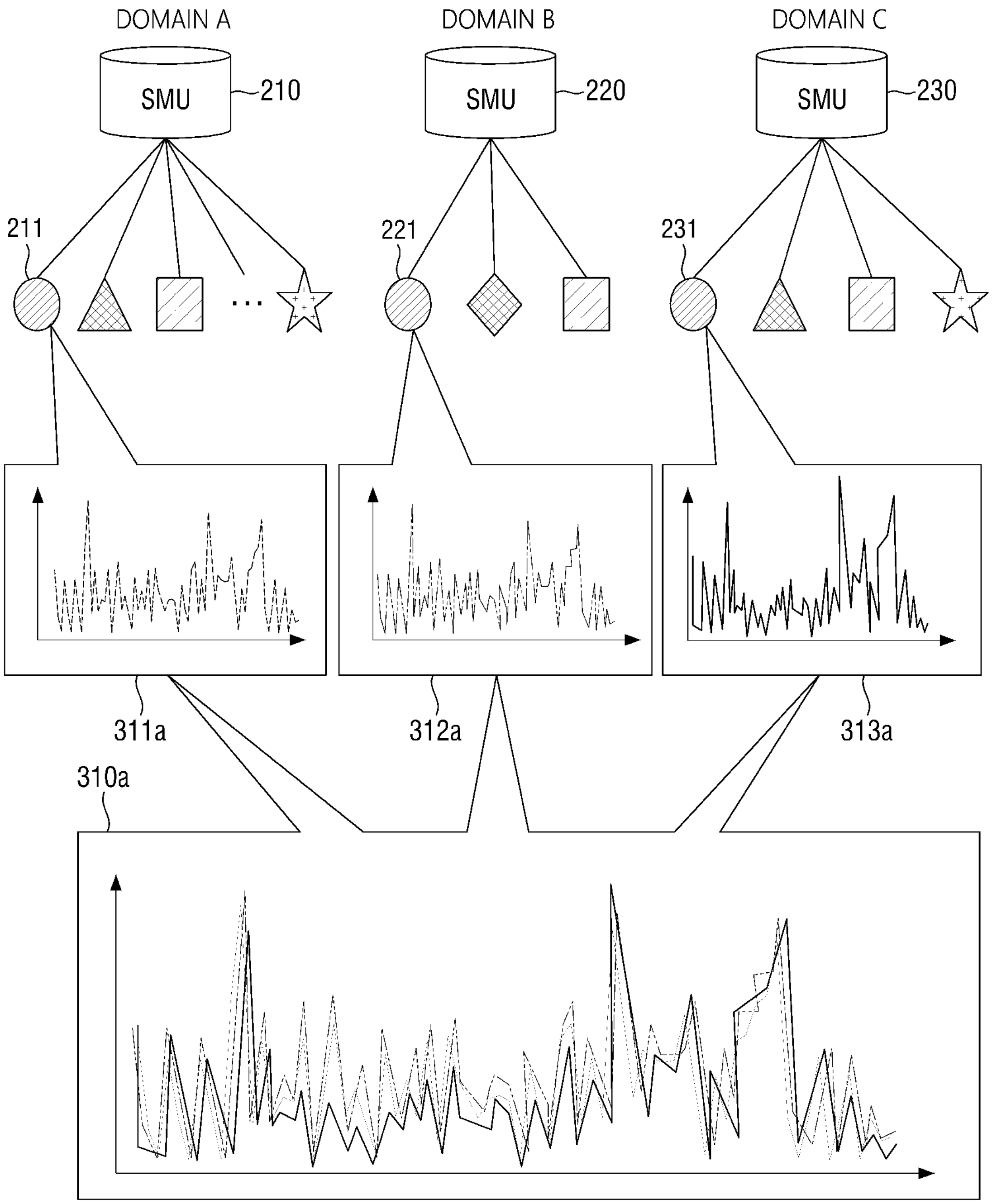
FIG. 7A is a view showing a method for detecting an anomaly in a plurality of devices using a plurality of similar information pieces according to yet another exemplary embodiment of the present disclosure.

A method for detecting an anomaly in devices based on similarity obtained by comparing status information of devices will be described with reference to FIG. 7A.

According to yet another exemplary embodiment of the present disclosure, when there are Domains A, B and C managed by SMU 210, 220 and 230, respectively, an anomaly in a device 211 of interest may be detected by using similarity between information on the device 211 and information on the devices designated for detecting an anomaly in the device 211. It is, however, to be understood that the present disclosure is not limited thereto. All of the devices of interest and the designated devices may be included in a single domain or some devices may be included in the same domain.

For example, it is possible to determine that there is an anomaly in the device of interest 211 if the data items on the CPU usages 311*a*, 312*a* and 313*a* on the devices are similar with one another within a predetermined margin as a result of collectively analyzing the CPU usages 311*a*, 312*a* and 313*a* to obtain resulting data 310*a*, which is otherwise not detected by individually observing the information on each of the CPU usage 311*a* of the device of interest and the CPU usages 312*a* and 313*a* of the designated devices 221 and 231. In addition, it may be determined that there is an anomaly in the designated devices 221 and 231 as well.

Although the CPU usage is used as an example of the device information according to the exemplary embodiment of the present disclosure, the device information is not limited thereto. Memory usage, network inbound traffic amount and network outbound traffic amount may be used as the device information.

Figure 7B:
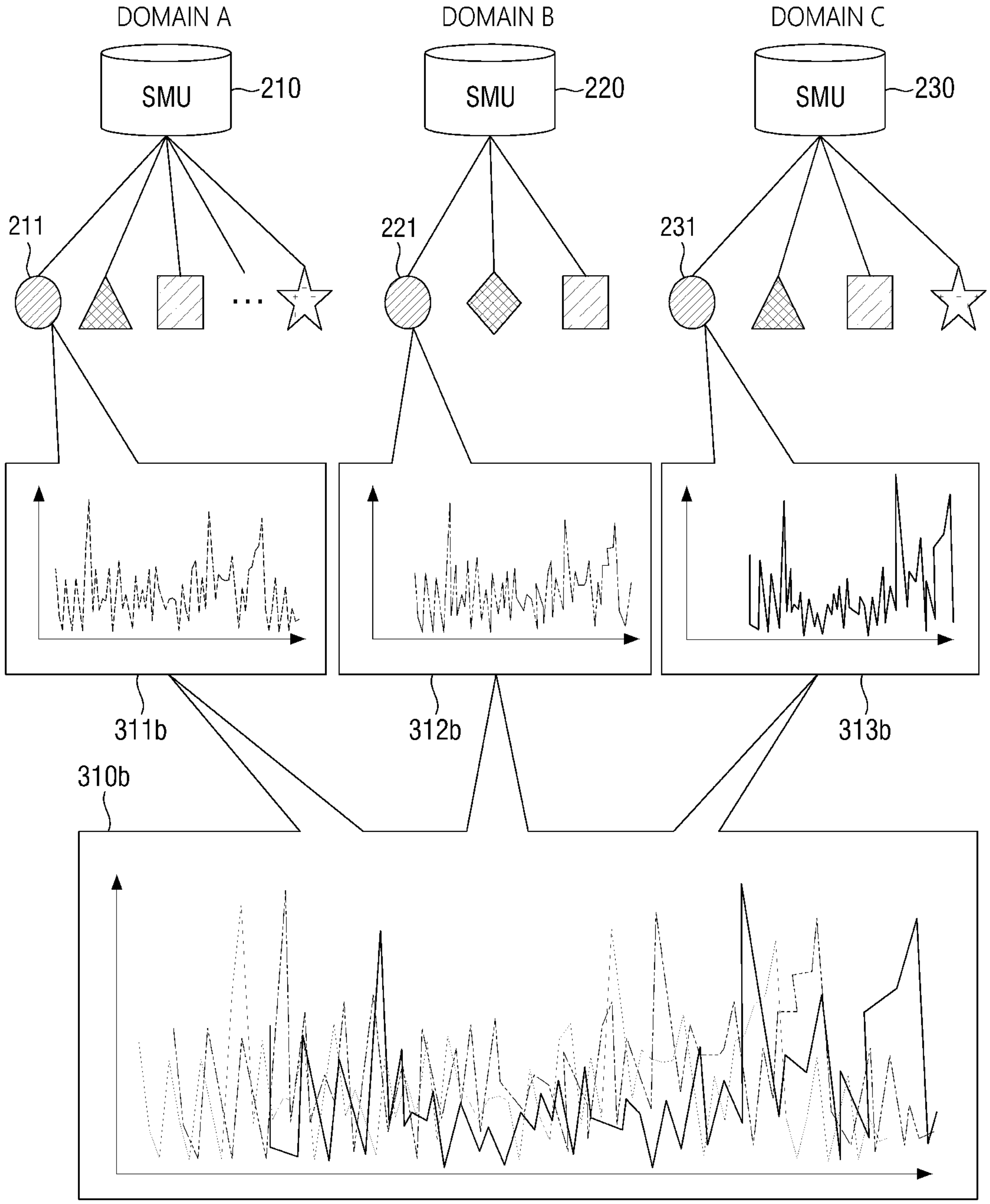
FIG. 7B is a view showing a method for detecting an anomaly in a plurality of devices using device information including a plurality of similar patterns according to yet another exemplary embodiment of the present disclosure.

A method for detecting an anomaly in devices by comparing the status information of devices including the same or similar patterns will be described with reference to FIG. 7B.

According to still another exemplary embodiment of the present disclosure, it is possible to detect an anomaly in a plurality of devices including device status information 311*b*, 312*b* and 313*b* in similar patterns at intervals within a critical time, as well as a plurality of devices including similar device status information at the same time.

For example, although devices 211, 221 and 231 have status information 311*b*, 312*b* and 313*b* in different patterns at a certain time point, they may have patterns that are repeated with a certain time interval. Then, it may be determined that there is an anomaly in the device of interest 211. In addition, it may be determined that there is an anomaly in the designated devices 221 and 231 as well.

Figure 8:
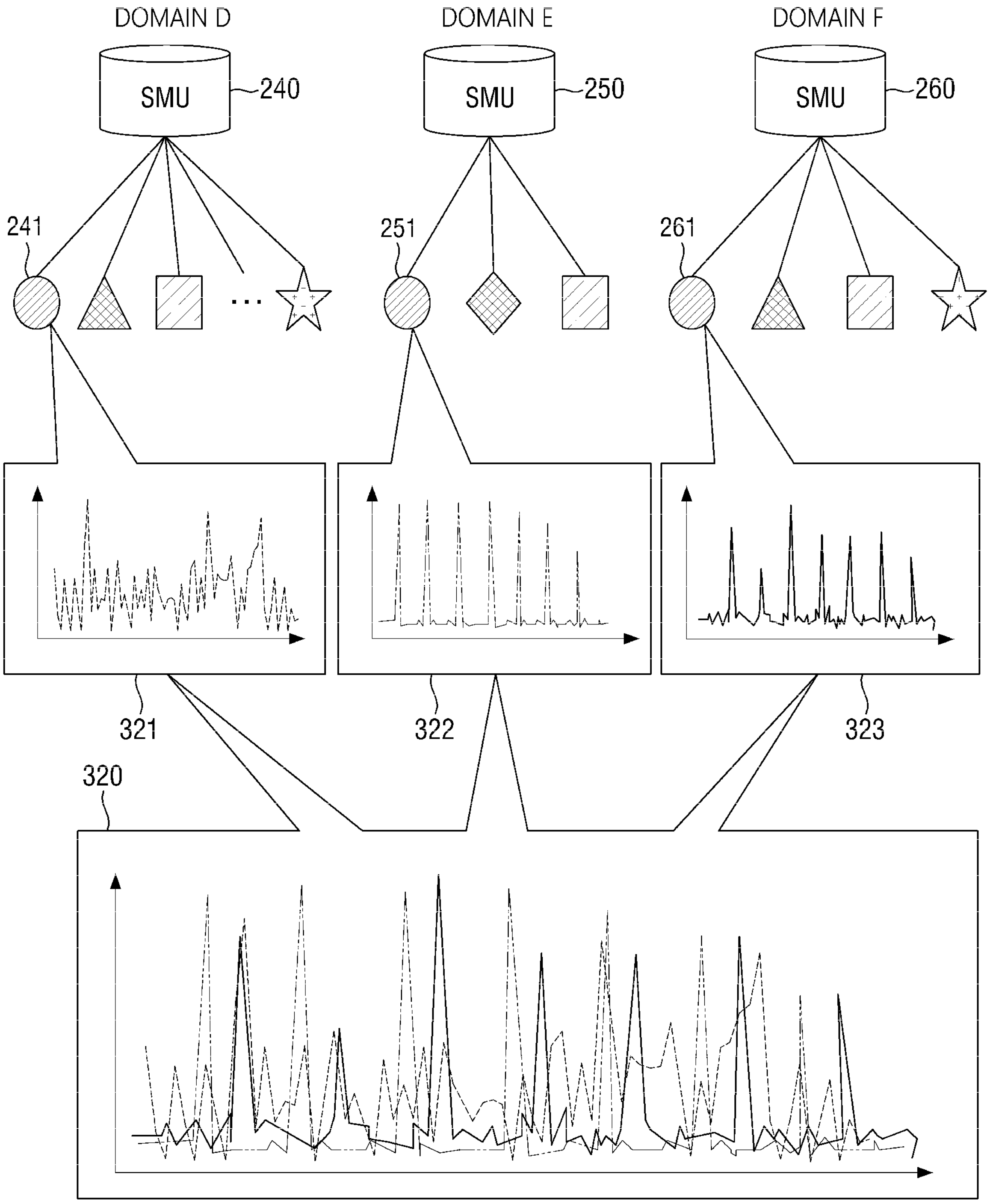
FIG. 8 is a view showing a method for detecting an anomaly in a plurality of devices using meaningful resulting data obtained by collecting information on devices according to yet another exemplary embodiment of the present disclosure.

A method for detecting an anomaly when resulting data obtained by collectively analyzing the status information on devices is meaningful will be described with reference to FIG. 8.

According to yet another exemplary embodiment of the present disclosure, when there are Domains D, E and F managed by SMU 240, 250 and 260, respectively, an anomaly in a device 241 of interest may be detected depending on whether resulting data 320 obtained by collectively analyzing the information on the device 241 and the information on devices 251 and 261 designated for detecting an anomaly in the device of interest is meaningful.

For example, it may be determined that there is an anomaly in the device of interest 241 and the designated devices 251 and 261 if the resulting data 320 obtained by collectively analyzing the network inbound traffic amounts of the devices is meaningful, which is otherwise not detected by individually observing the information on each of data 321 on the network inbound traffic amount of the device of interest, and on the data 322 and 323 on the network inbound traffic amounts of the designated devices.

For example, if the resulting data 320 obtained by summing the network inbound traffic amounts 321, 322 and 323 of the devices is equal to the network traffic amount transmitted from a particular malicious code, the resulting data 320 is meaningful, and thus it may be determined that there is an anomaly in the devices 241, 251 and 261.

Although the network inbound traffic amount is used as an example of the device information according to the exemplary embodiment of the present disclosure, the device information is not limited thereto. The device information may be one of CPU usage, memory usage and the network outbound traffic amount.

Figure 9:
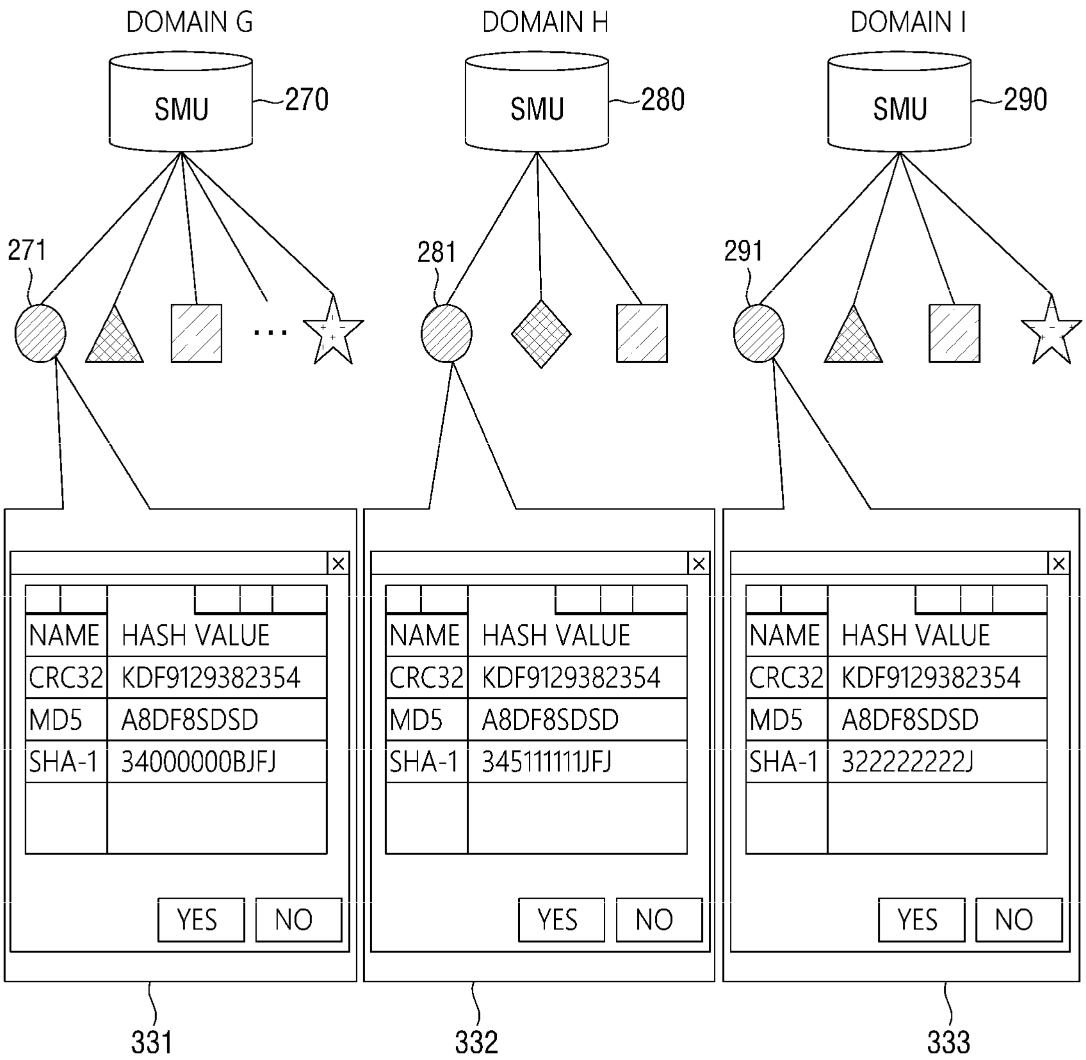
FIG. 9 is a view showing a method for detecting an anomaly in devices using file information on the devices according to yet another exemplary embodiment of the present disclosure.

Hereinafter, a method for detecting an anomaly using the file information of devices will be described in detail with reference to FIG. 9.

According to yet another exemplary embodiment of the present disclosure, it is possible to detect an anomaly by using file information including file names, file sizes and file hash values stored in a device of interest and designated devices.

For example, if there is a file having the file name not on the white list or files having the same file size in the a device of interest 271 and a plurality of designated devices 281 and 291, the file is likely to be associated with attack of a malicious code. In such case, it may be determined that there is an anomaly in the device 271 and the designated devices 281 and 291.

According to yet another exemplary embodiment of the present disclosure, an anomaly in a device of interest 271 may be detected by using information on file hash values. It is possible to determine whether a file is genuine file distributed by a manufacturer or a tampered file based on the file hash values. If the hash value of the genuine file differs from the hash value of the current file, it is likely that a malicious code or virus has been inserted in the file.

In detecting an anomaly using the hash value information 331 of the file stored in the device of interest 271 and the hash value information 332 and 333 of the file stored in the plurality of designated devices 281 and 291, the hash values may be the same if the files stored in the devices are the same.

For example, if the CRC32 value of the genuine file of the file stored in the devices is KDF9129382354, the MD5 value thereof is A8DF8SDSD and the SHA-1 value thereof is 345111111JFJ, the SHA-1 value of the file hash value 331 of the device of interest is different from that of the genuine file, and thus it is determined that there is an anomaly in the device 271. In addition, the file hash values 332 of the designated device 281 are identical to the hash values of the genuine file and thus it is determined that there is no anomaly in the device 281. The SHA-1 value of the hash values 333 of the device 291 is different from that of the genuine file and thus it is determined that there is an anomaly in the device 291.

When the hash values of the genuine file is not available, it may be determined that the device of interest 271 has been infected by a malicious code if the device 271 has a hash value different from that of the same file of the designated devices 281 and 291. Even if the hash values of the device 271 are identical to the hash values of the designated devices 281 and 291, it may be determined that all of the devices have been infected by a malicious code. As such, it is to be noted that the information on the hash values on the file may be analyzed in a variety of ways.

Figure 10:
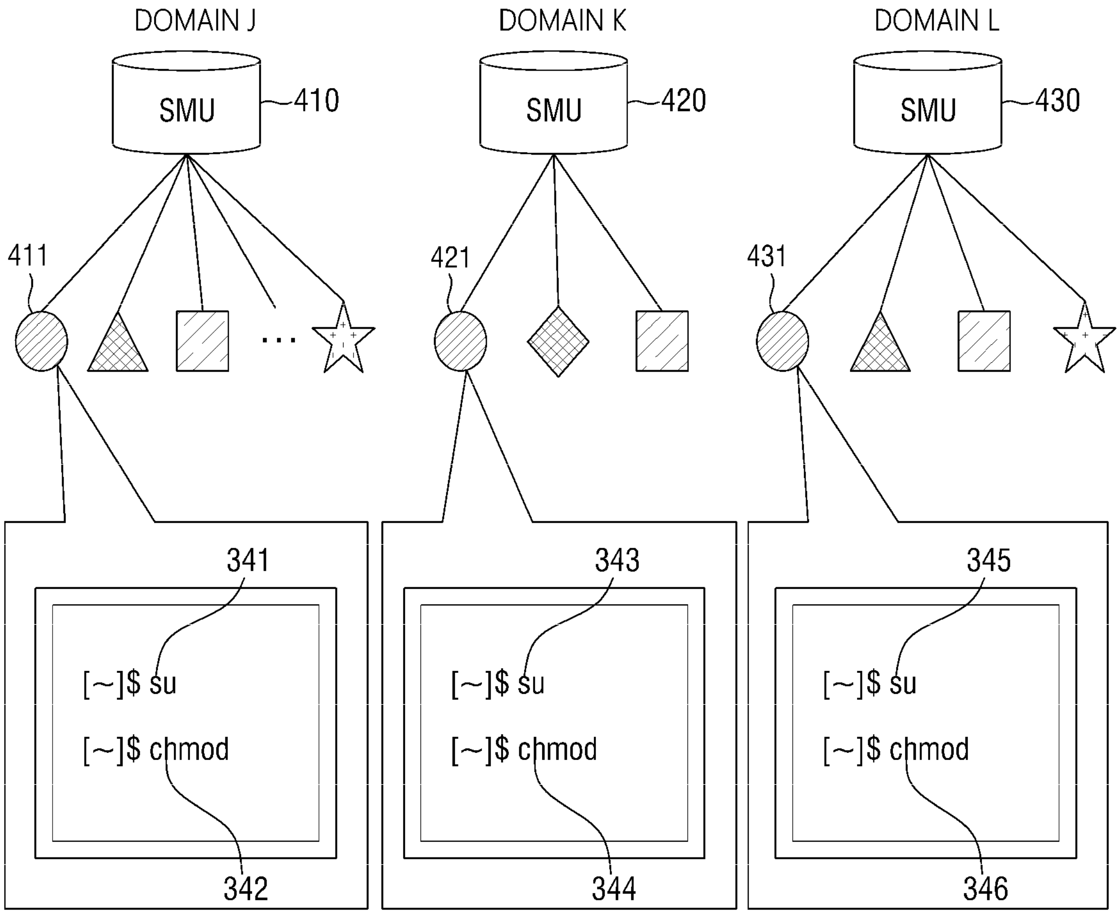
FIG. 10 is a view showing a method for detecting an anomaly in devices using commands input to the devices according to yet another exemplary embodiment of the present disclosure.

A method for detecting an anomaly in devices by analyzing commands input to the devices will be described with reference to FIG. 10.

According to yet another exemplary embodiment of the present disclosure, it may be determined that there is an anomaly in a plurality of devices if two same commands are input in a row to the plurality of devices row or if the same command is simultaneously input to the plurality of devices. In addition, when a command to terminate a process is input to a device of interest, it may be determined that there is an anomaly in the device. When su commands 341, 343 and 345 and chmod commands 342, 344 and 346 are input to the device of interest, it may be determined that there is an anomaly in the device. More detailed description thereon will be given below.

According to yet another exemplary embodiment of the present disclosure, when a device of interest 411 and designated devices 421 and 431 are included in different domains managed by different SMUs 410, 420 and 430, respectively, it is highly likely that the devices 411, 421 and 431 have been attacked by the same malicious code or are already infected zombie devices if the su commands 341, 343 and 345 to change the user authority to a particular account are input to the devices simultaneously or they have the same account authority at the same time point, When this happens, it may be determined that there is an anomaly in the plurality of devices 411, 421 and 431.

It is, however, to be understood that the present disclosure is not limited thereto. It may be determined that there is an anomaly in the devices 411, 421 and 431 if the authority of files or directories included in the devices 411, 421 and 431 are changed through the chmod commands 342, 344 and 346.

Figure 11:
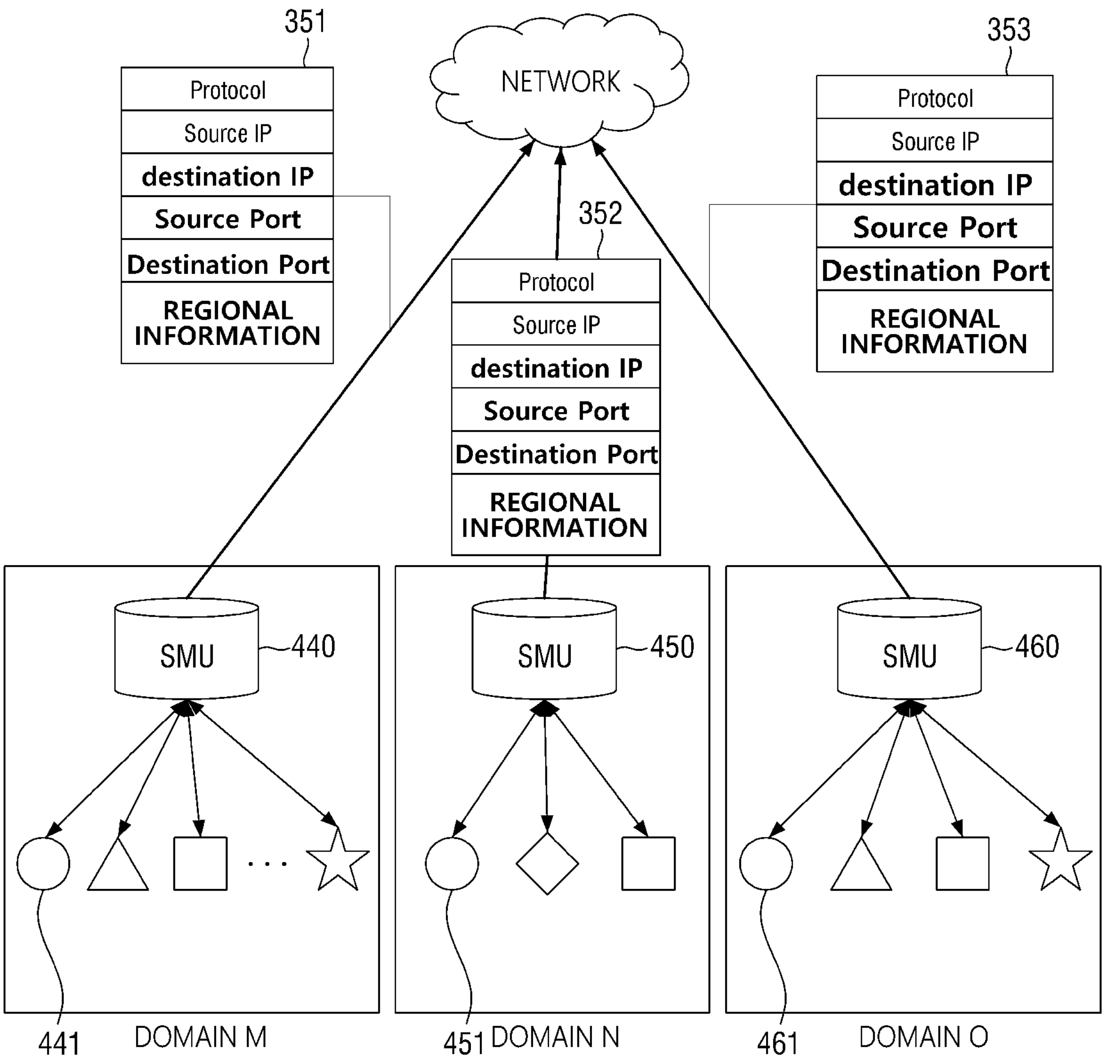
FIG. 11 is a view showing a method for detecting an anomaly in devices using outbound traffic information on the devices according to yet another exemplary embodiment of the present disclosure.

A method for detecting an anomaly in devices included in domains using outbound network traffic information of the domains will be described with reference to FIG. 11.

In detecting an anomaly in devices 441, 451 and 461 using the outbound network traffic information of the domains transmitted through the SMUs 440, 450 and 460, respectively, source IPs, which are the IPs of the devices 441, 451 and 461 included in the domains, may not be used in order to reduce the computational burden because of the outbound network traffic nature. Therefore, when outbound network packet information 351, 352 and 353 is used, destination IPs, destination ports, source ports and regional information of destinations may be used. In such case, it is to be noted that destination IPs, destination ports and source ports included in the white list may be excluded in detecting an anomaly.

Specifically, according to the exemplary embodiment of the present disclosure, it may be determined that there is an anomaly in the devices 441, 451 and 461 if the destination IP, the destination port or the source port is identical as a result of analyzing the network packet transmitted by the device 441 and the devices 451 and 461. In addition, it may be determined there is an anomaly if the region of the destination is identical. In such case, it is possible to detect an anomaly in the devices by using a plurality of information pieces, which cannot be detected by analyzing network packets of each of the devices 441, 451 and 461.

Figure 12:
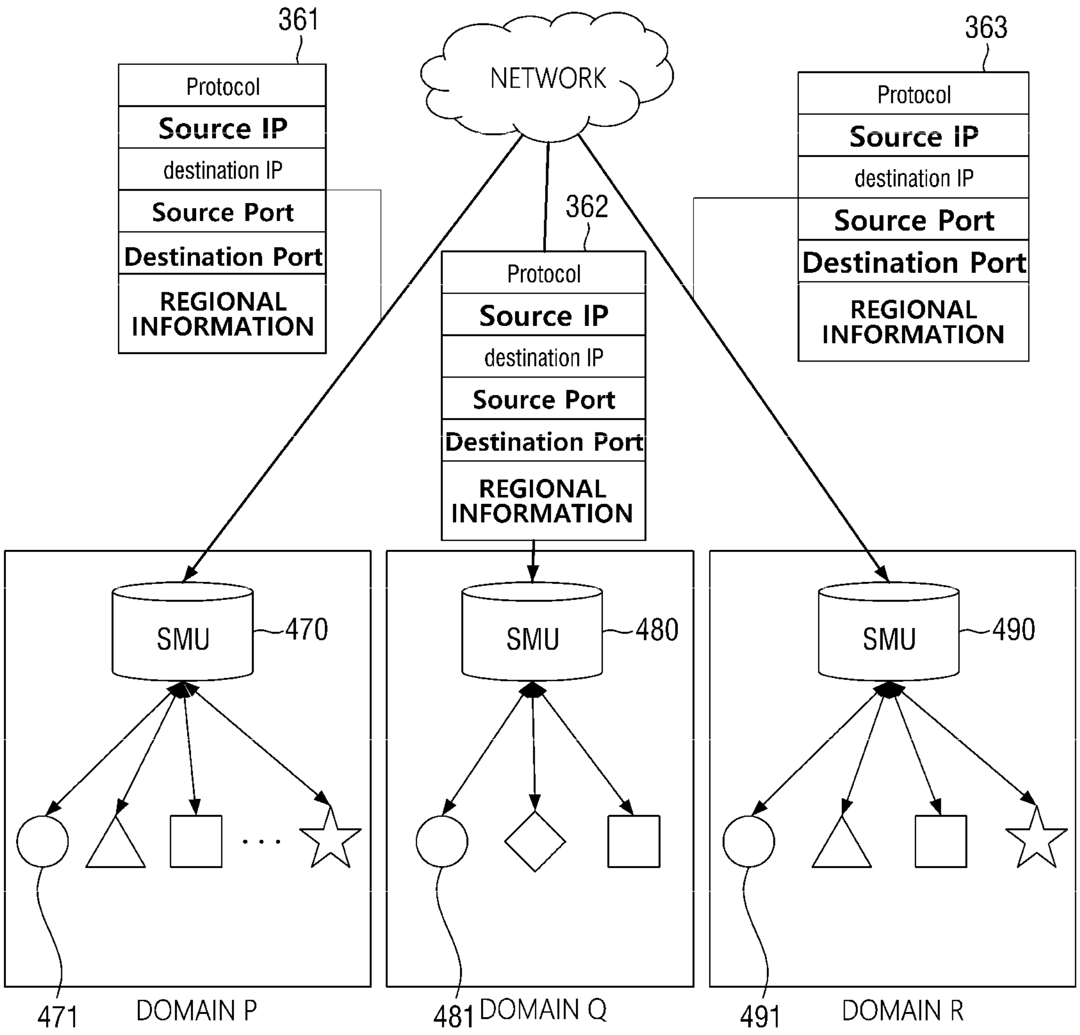
FIG. 12 is a view showing a method for detecting an anomaly in devices using inbound traffic information on the devices according to yet another exemplary embodiment of the present disclosure.

A method for detecting an anomaly in devices included in domains using inbound network traffic information of the domains will be described with reference to FIG. 12.

In detecting an anomaly in devices 471, 481 and 491 using the inbound network traffic information of the domains received through the SMUs 270, 280 and 290, respectively, destination IPs, which are the IPs of the devices 471, 481 and 491 included in the domains, may not be used in order to reduce the computational burden because of the inbound network traffic nature. Therefore, when inbound network packet information 361, 362 and 363 is used, source IPs, source ports, destination ports and regional information of source may be used. In such case, it is to be noted that source IPs, source ports and destination ports included in the white list may be excluded in detecting an anomaly.

Specifically, according to the exemplary embodiment of the present disclosure, it may be determined that there is an anomaly in the devices 471, 481 and 491 if the source IP, the destination port or the source port is identical as a result of analyzing the network packet received by the device 471 and the devices 481 and 491. In addition, it may be determined there is an anomaly if the region of the source is identical. In such case, it is possible to detect an anomaly in the devices by using a plurality of information pieces, which cannot be detected by analyzing network packets of each of the devices 471, 481 and 491.

Figure 13:
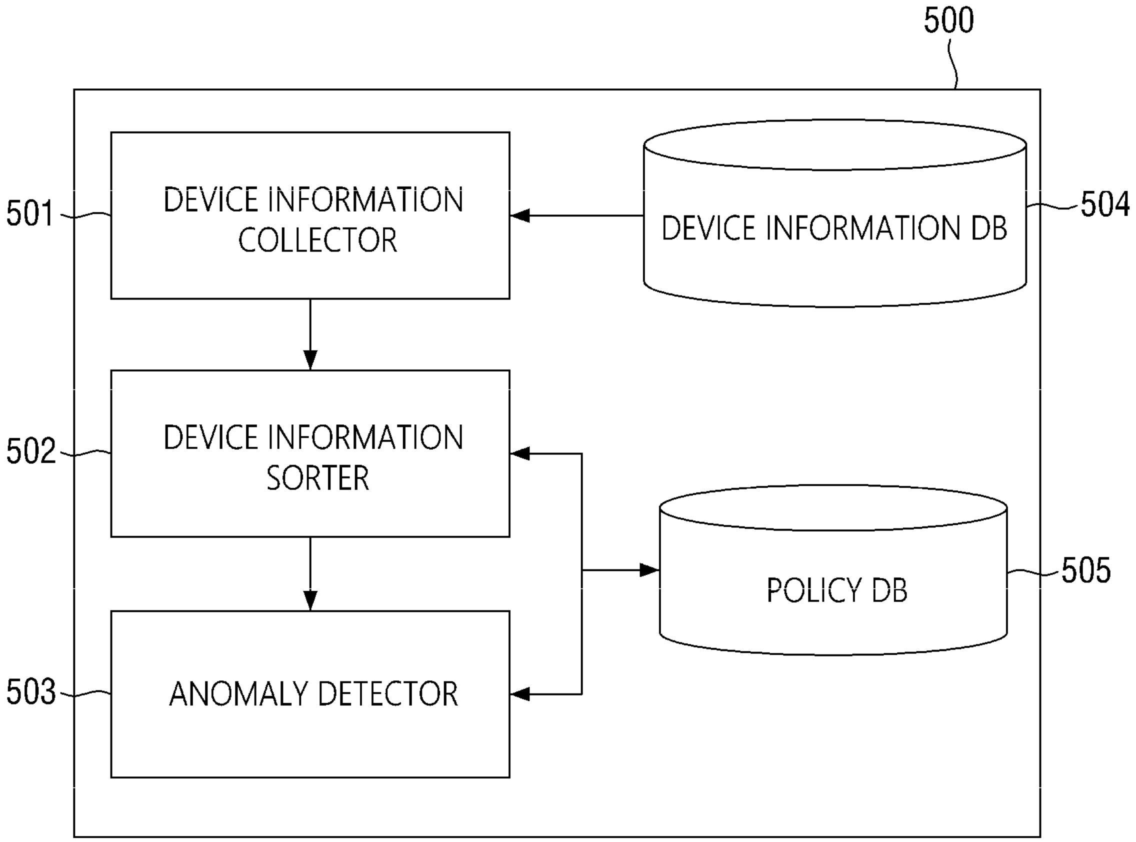
FIG. 13 is a block diagram showing a hardware configuration of an apparatus for detecting an anomaly in devices according to still another exemplary embodiment of the present disclosure.

FIG. 13 illustrates a block diagram of an apparatus for detecting an anomaly in devices. The operation of an apparatus for detecting an anomaly in devices will be described with reference to FIG. 13.

According to another exemplary embodiment, an apparatus 500 for detecting an anomaly in devices may include a device information collector 501, a device information sorter 502, an anomaly detector 503, a device information DB 504, and a policy DB 505 for detecting an anomaly in devices.

The device information DB 504 may include at least one of information on product names, manufacturers, versions and firmware of devices.

The policy DB 505 may include rules for information to be detected as an anomaly of the device status information through analysis of a variety of malicious codes. For example, the policy DB may include a rule associated with the CPU usage described above, a rule for determining there is an anomaly if a device uses the memory capacity of 50% or higher for more than five minutes, etc.

The device information collector 501 may acquire information on a device of interest in a domain for detecting an anomaly from the device information DB 504.

The device information sorter 502 may sort out a minimum amount of the information among the information acquired by the device information collector 501 using the policy DB 505. For example, when inbound network traffic information is used, the source IPs, source ports, destination ports and regional information of source may be sorted out among the network packet information, except for information on destination IPs. If certain information is on the white list, the information may not be used.

The anomaly detector 503 may detect whether the information sorted out by the device information sorter 502 satisfies the rules included in the policy DB 505 to determine whether there is an anomaly in the device of interest.

Figure 14:
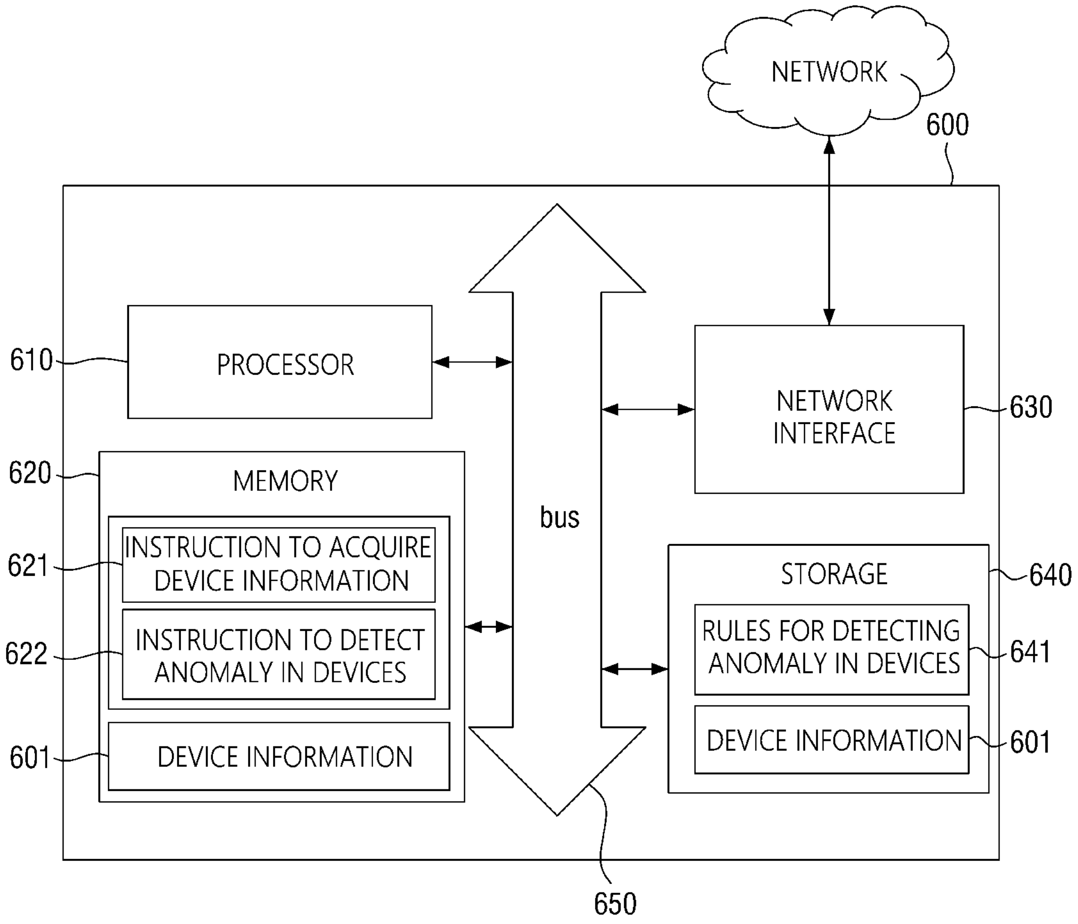
FIG. 14 is a block diagram showing a hardware configuration of an apparatus for detecting an anomaly in devices according to still another exemplary embodiment of the present disclosure.

As shown in FIG. 14, according to yet another exemplary embodiment, a computing device 600 performing a method for detecting an anomaly in devices may include a processor 610 and a memory 620 and may further include at least one of storage 640, a network interface 630 and a system bus 650 in some implementations.

One or more instructions 621 and 622 loaded and stored in the memory 620 are executed through the processor 610. It is to be understood that the computing device 600 can perform the method for detecting an anomaly in devices described above with reference to FIGS. 1 to 12.

The network interface 630 may send/receive packets to/from a device of interest or an SMU that manages a domain including the device. The received information may be stored in the storage 640.

The storage 640 may store therein rules 641 for detecting an anomaly in devices and device information 601.

The instructions may include an instruction 621 for obtaining information on a device of interest and an instruction 622 for detecting an anomaly in the device of interest based on the information.

In an exemplary embodiment, the instruction 621 may acquire a minimum amount of the information 601 to detect an anomaly in the device among the information on the device.

In an exemplary embodiment of the present disclosure, the instruction 622 for detecting an anomaly in the device of interest can detect if there is an anomaly in the device of interest by matching the device information 601 with the rules for detecting an anomaly in devices.

What is claimed is:

1. A method for detecting an anomaly in devices, the method being performed by a computing device and comprising:

acquiring operation information on a first device connected to a security management unit (SMU) of a first domain and operation information on a second device connected to a SMU of a second domain; and detecting an anomaly in the first device and the second device by comparing the operation information on the first device with the operation information on the second device, wherein the SMU of the first domain is not directly connected to the SMU of the second domain, wherein detecting the anomaly comprises:

acquiring two or more consecutive first commands being entered on the first device, acquiring two or more consecutive second commands being entered on the second device, and detecting the anomaly based on determination that the first commands and the second commands being entered at the same time, wherein both of the first commands and second commands include a command to modify a user authority, a command to modify file permissions, and a command to terminate a process, and wherein the first commands and the second commands are the same.

2. The method of claim 1, further comprising validating the anomaly based on a manufacturer of the first device being identical to a manufacturer of the second device.

3. The method of claim 2, further comprising validating the anomaly based on a product name of the first device being identical to a product name of the second device.

4. The method of claim 1, further comprising validating the anomaly based on the first domain being identical to the second domain.

5. The method of claim 4, further comprising validating the anomaly based on a product name of the first device being different from a product name of the second device and a manufacturer of the first device being identical to a manufacturer of the second device.

6. The method of claim 1, further comprising validating the anomaly based on the operation information of the first device being similar to the operation information of the second device.

7. The method of claim 6, further comprising validating the anomaly based on pattern information on behavior of the first device being similar to pattern information on behavior of the second device.

8. The method of claim 1, wherein detecting the anomaly comprises using information obtained by combining behavior information of the first device and behavior information of the second device different from the behavior information of the first device.

9. The method of claim 1, wherein detecting the anomaly comprises comparing a cycle of a power status of the first device with a cycle of a power status of the second device.

10. The method of claim 1, wherein detecting the anomaly comprises comparing process information of the first device with process information of the second device.

11. The method of claim 10, wherein detecting the anomaly further comprises comparing CPU usage of a process running in the first device with CPU usage of a process running in the second device.

12. The method of claim 10, wherein detecting the anomaly further comprises comparing memory usage of a process running in the first device with memory usage of a process running in the second device.

13. The method of claim 1, wherein detecting the anomaly comprises comparing file hash values of the first device with file hash values of the second device.

14. The method of claim 1, wherein detecting the anomaly comprises comparing inbound packet information sent to the first device with inbound packet information sent to the second device.

15. The method of claim 14, wherein detecting the anomaly further comprises comparing source regional information of inbound packet sent to the first device with source regional information of inbound packet sent to second first device.

16. The method of claim 1, wherein detecting the anomaly comprises comparing outbound packet information sent to the first device with outbound packet information sent to the second device.

17. The method of claim 16, wherein detecting the anomaly further comprises comparing destination regional information of outbound packet sent to the first device with destination regional information of outbound packet sent to second first device.

* * * * *